United States Patent [19]

Höhn

[11] Patent Number: 4,458,939
[45] Date of Patent: Jul. 10, 1984

[54] VEHICLE, ESPECIALLY CAMPING VEHICLE

[76] Inventor: Roland Höhn, Lipfersbergerstr. 20, D-7118 Ingelfingen, Fed. Rep. of Germany

[21] Appl. No.: 249,712

[22] Filed: Mar. 31, 1981

[30] Foreign Application Priority Data

Apr. 1, 1980 [DE] Fed. Rep. of Germany ....... 3012682
Jun. 16, 1980 [DE] Fed. Rep. of Germany ....... 3022617

[51] Int. Cl.³ ............................................... B60P 3/32
[52] U.S. Cl. ................................. 296/164; 296/166; 296/65 R; 297/14
[58] Field of Search ............... 296/164, 156, 166, 167, 296/175, 25, 65 R, 64; 297/14

[56] References Cited

U.S. PATENT DOCUMENTS

| 1,428,748 | 9/1922 | Brososky | 296/25 |
| 3,095,232 | 6/1963 | Stevens | 296/65 R |
| 3,165,350 | 1/1965 | Wilson | 296/156 |
| 3,297,355 | 1/1967 | Robinson | 296/166 |

FOREIGN PATENT DOCUMENTS 227065 1/1925 United Kingdom ................. 296/25

Primary Examiner—Robert R. Song
Attorney, Agent, or Firm—Andrus, Sceales, Starke & Sawall

[57] ABSTRACT

Camping adapter unit mounted on a motor vehicle having a cab and a load platform extending behind the cab. The load platform has an opening therein adjacent the cab, and the adapter unit has a tub portion projecting through the opening in the platform to form an increased height for standing in the interior of the adapter unit.

25 Claims, 4 Drawing Figures

VEHICLE, ESPECIALLY CAMPING VEHICLE

DESCRIPTION

Background of the Invention

The invention relates to motor vehicle, especially camper with cab and living space and a passage way from cab to living space.

The formation of the living space in the form of so called "pick-up mountings" hereinafter referred to as a camping addition is known and is especially popular in the U.S.A. The camping additions which are known are, however, very limited in their spaciousness and are consequently uncomfortable, or they are so large that they extend beyond the roof of the cab as well as beyond the rear length of the vehicle. The latter constructions make the vehicle extremely subject to wind forces and based on large weight very difficult to maneuver. Furthermore, the latter construction requires a lot of material since it is very voluminous. The manoeuvrability is further greatly reduced because the height of the construction elevates the center of gravity of the vehicle. Finally, the wind resistance is relatively high because of the height of the construction, which has the result in the fuel consumption increasing correspondingly.

Therefore, this invention has the objective to create a pick up housing, which is easily installed. The housing does not or only barely extends beyond the dimensions of the vehicle while providing a sufficiently large interior volume and living spacing, especially an area with standing room height.

SUMMARY OF THE PRESENT INVENTION

This objective is surprisingly accomplished in the simple manner by forming the living space through the use of the camping addition which is fastened on the loading area of the motor vehicle and which has a recess in its bottom which matches a corresponding recess in the loading surface of the motor vehicle immediately adjacent to the cab. The comper additions extend ward to a tub-like depression which in the area of the recess a larger clear height (standing height) in the interior of the mounting, that is the living space.

The crux of the invention is the fact that the interior space of the camping housing, that is the living space, is enlarged "downward". This eliminates the requirement of a so called "upper roof" which is relatively demanding in its construction as well as in its handling. Of course, this does not exclude the additional installation of a conventional upper roof.

The construction in accordance with this invention is especially suited in contrast to known constructions for example in accordance with U.S. Pat. No. 3,719,244, for owners of very small motor vehicles with relatively small loading area or motor cars with loading areas in which it is difficult to install a high mounting, especially one that guarantees standing room. One only has to devise a recess in the loading surface behind the cab which can be closed after the removing of the camping mounting by means of a lid or the like.

All other known solutions add to the height in contrast to this invention and its solution (see, for example, U.S. Pat. No. 3,736,019, 3,489,454, 3,659,894). The space below the load platform of so called pick-up trucks is not utilized in the known solutions.

The tub-like depression immediately adjacent to the cab considerably facilitates entrance into the interior of the camping mounting from the cab since the person's legs can immediately be stretched downwards, so that the person can reach the living space from the cab of the motor vehicle essentially in upright posture.

The upper edge of the depression is preferably equipped with pads for seating.

The invented construction is especially advantageous for a vehicle with a closed load space immediately behind the cab and under the load surface (for example on VW light carriages). In this case the tub-like depression extends into the load space where preferably the bottom of the load space forms the bottom of the depression. This, however, does not have to be so if the downward extending depression is formed by a closed tub which is fitted to the bottom of the camping mount or which is fastened in a removable manner.

The cabs of very small vehicles, station wagons, back-seat wagons, which are suitable for the described camping additions, are generally equipped with benches for seating. Such a bench makes if difficult to enter into the living space from the cab. The cab therefore would have to be equipped with single seats spaced relatively far apart from one another to obtain an easier access to the living space. The space between the two individual seats must be kept open to reach the living space from the cab and vice versa while the vehicle is being driven. It is disadvantageous however that this space between the two individual seats is lost space, especially since it does not seat a third person in the cab. These disadvantages can be avoided in a motor vehicle especially by means of a passage way from cab to the living space between driver and passenger seats by placing the driver and passenger seat sufficiently away from one another so that a third seat can be installed between them, and that this third seat is a folding seat which can be pushed or turned behind the driver and passenger seats, that is between them and the back wall. This seat design, of course, can not only be used in a vehicle with the above described camping addition, but can generally be used for mobile homes with cab and living space and with a passage way from cab to living space.

The seating arrangement of the invention also elegantly connects the advantages of the seating bench with the advantages of individual seats. At least three persons can sit next to each other in the cab where simultaneous side restraint for the passenger and the driver is guaranteed by proper design of the individual seats. Especially during traffic accidents it has been shown that the seats with lacking side restraints resulted in injuries which otherwise could have been avoided. These disadvantages can be avoided in a simple way by means of the invented seat arrangement.

Preferably the driver seat as well as the passenger seat are contour seats with side pads on seat and back.

In this respect it is preferred the side pads be of symmetric cross section so that the third seat, that is the center seat, when in use has the comfort of the contoured seat.

The claims given below describe in more detail the preferred constructive development regarding the camping addition and the connection with the motor vehicle in accordance with the seat arrangement of this invention.

DESCRIPTION OF THE DRAWING FIGURES

The following is a preferred embodiment of the invention using the attached drawing for closer description. Shown is:

FIG. 1. A vehicle with camping addition in side view, with partially removed side wall.

FIG. 2. The vehicle with camping addition in accordance with FIG. 1 in top view.

FIG. 3. A different embodiment of a camping addition, and

FIG. 4. A seat arrangement in the cab of a vehicle with camping addition in accordance with FIG. 1 through FIG. 3.

DESCRIPTION OF THE ILLUSTRATED EMBODIMENT

Figure 1:
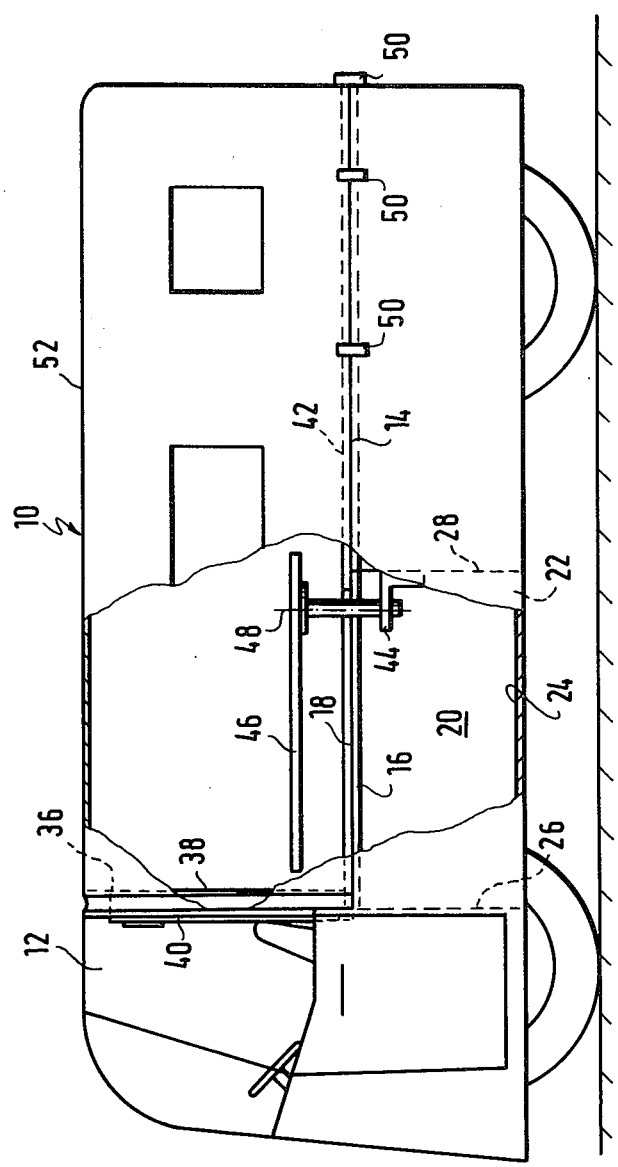
Figure 2:
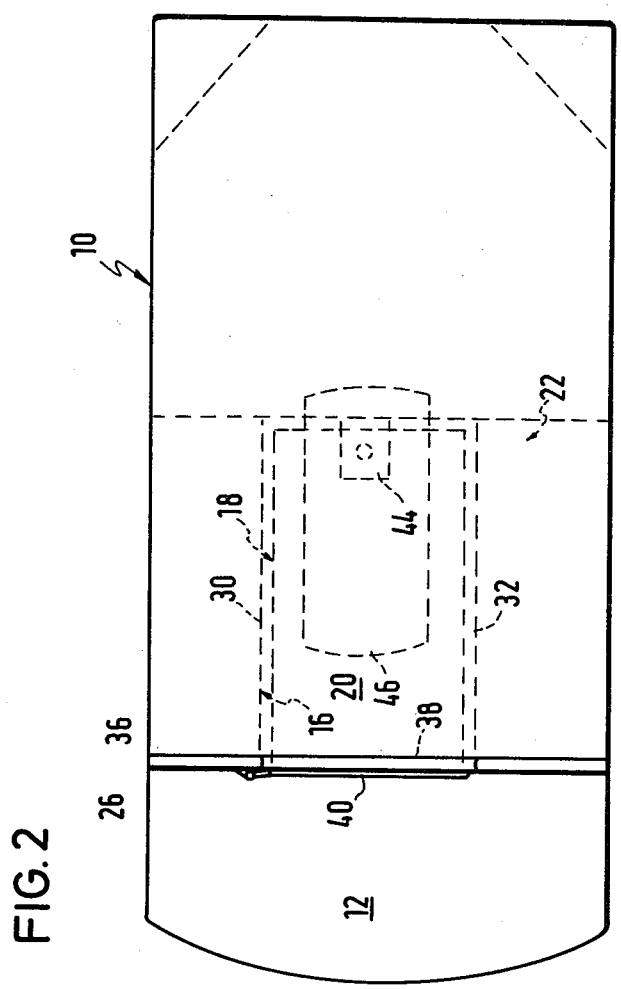
Figure 3:
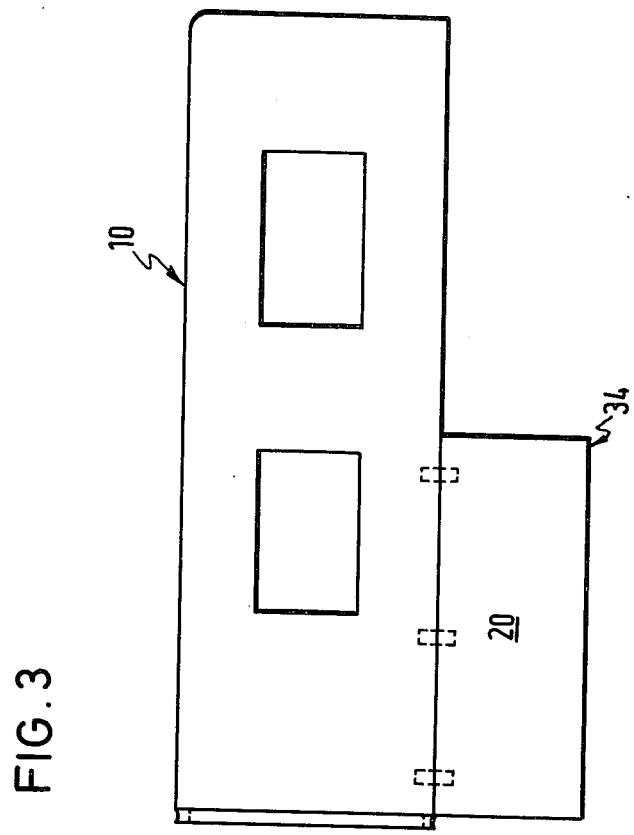

In FIGS. 1 and 2 a motor-powered transporter, that is pick-up wagon, with cab 12 and a load area or platform 14 is schematically shown on which is attached a camping addition 10 by means of buckle connectors 50 to form a living space. The camping addition 10 is approx. the form of a square where roof 52 connects to the roof of cab 12. The bottom 42 of the camping addition 10 lies on load platform 14 of the transporter. Preferably vibration dampers, not shown are installed between the underside of the addition 10 and the load platform which keep the living space or the camping addition 10 relatively free of vibrations.

It is preferred that the side walls not shown and the rear wall of the load platform is removed before fastening of the camping addition 10. Then the fastening of the camping addition 10 can be done by means of the buckle connectors connected to the walls of the loading platform.

The transporter shows in FIG. 1 and 2 a load space 22 which is closed and which is immediately behind the cab under the lod platform, being accessible from side doors. As shown in FIG. 1 and 2, load platform 14 above load space 22 shows an opening 16 which approximately corresponds to an opening 18 in the bottom 42 of camping addition 10. This creates in the area of opening 16 a free space downward which is incorporated in the interior or the living space of camping addition 10. Between the upper edges of load surface opening 16 extending in the longitudinal direction of the vehicle and bottom 24 of load space 22 are installed side walls 30, 32 so that these two side walls, as well as the rear cab wall 26 and across from it border wall 28 of the load space 22 forms an approximate tub shaped recess. Sufficient space for luggage or loading space remains between side walls 30 and 32 and the outer walls of the vehicle. It is preferred that side walls 30 and 32 are fastened in such a way that they can be removed so that the full load space 22 is available during the normal use of the transporter. In this case the opening 16 in the load surface 14 is closed by means of a lid.

A door 40 is provided in the rear cab wall 26 while there is a corresponding opening 38 in closure wall 36 adjacent to the rear cab wall 26, so that one can reach the interior of the camping addition from the cab through door 40 and opening 38. Opening 38 and door 40 are arranged above recess 20 which gives easy entrance into the interior of camping addition 10. If the floor of the cab is correspondingly low, opening 38 and door 40 can be extended approx. to floor 24 of load space 22. Door 40 is not absolutely necessary. By deleting door 40 one obtains a comfortable passage way between cab and living space, that is the interior room of the camping addition 10.

The embodiment in accordance with FIG. 1 shows a door 40 which extends approx. from load platform 14 almost to the roof of cab 12.

Instead of a door a lid can be provided, which can be easily removed. The lid is removed for use of camping addition 10 so that there always is present a passage way between cab 12 and camping addition 10.

Between rear cab wall 26 and the adjacent closure wall 36 of camping addition 10, there is arranged an air and water tight elastic seal strip at least around opening 38. Elasticity is required to balance relative motion between cap 12, that is the vehicle and camping addition 10, especially during travel.

The rear closure wall of camping addition 10 can have an additional access hatch or the like. This, however, is not necessary since entrance into the camping addition 10 should only occur from the cab. However, the access hatch is recommended for safety reasons.

A bracket 44 is attached to the rear wall 28 of load space 22 which carries a table 46 that can be pivoted about vertical axis 48. Table 46 preferably is dimensioned in such a way that it can be used simultaneously as the cover for opening 16 of load platform 14. The upper edge of opening 18 in floor 42 of the addition 10 is preferably equipped with seat pads which allows comfortable sitting around table 46. The persons legs can be stretched into recess 20. In the area of recess 20 the camping addition almost allows standing height. This is obtained by extending the interior space of camping addition 10 downward rather than upward by means of an elevated roof or the like which has been the practiced until now.

For vehicles which do not have a closed load space behind the cab underneath the load surface, camping addition 10 has a box (tub) 34, open on top, which corresponds to depression 20, which is fastened to bottom 42 of camping addition 10 by means of quick disconnect fasteners. The box, that is tub 34, can also be formed in one piece on bottom 42. The box, that is box 34, is then sunk into opening 16 of load surface 14. Should there be a drive shaft underneath the load surface in the way of installation of the box or tub 34, box 34 can generally be equipped with a central drive shaft tunnel.

The box or tub 34 can be arranged in the form of an extension. In that case the side walls, namely also the front and rear side walls of the tub-like depression, can be formed by means of canvas or other folding material.

The conventional elevated roof can be installed in roof 52 of the camping addition in order to obtain even a larger height in the interior space of the addition 10.

Figure 4:
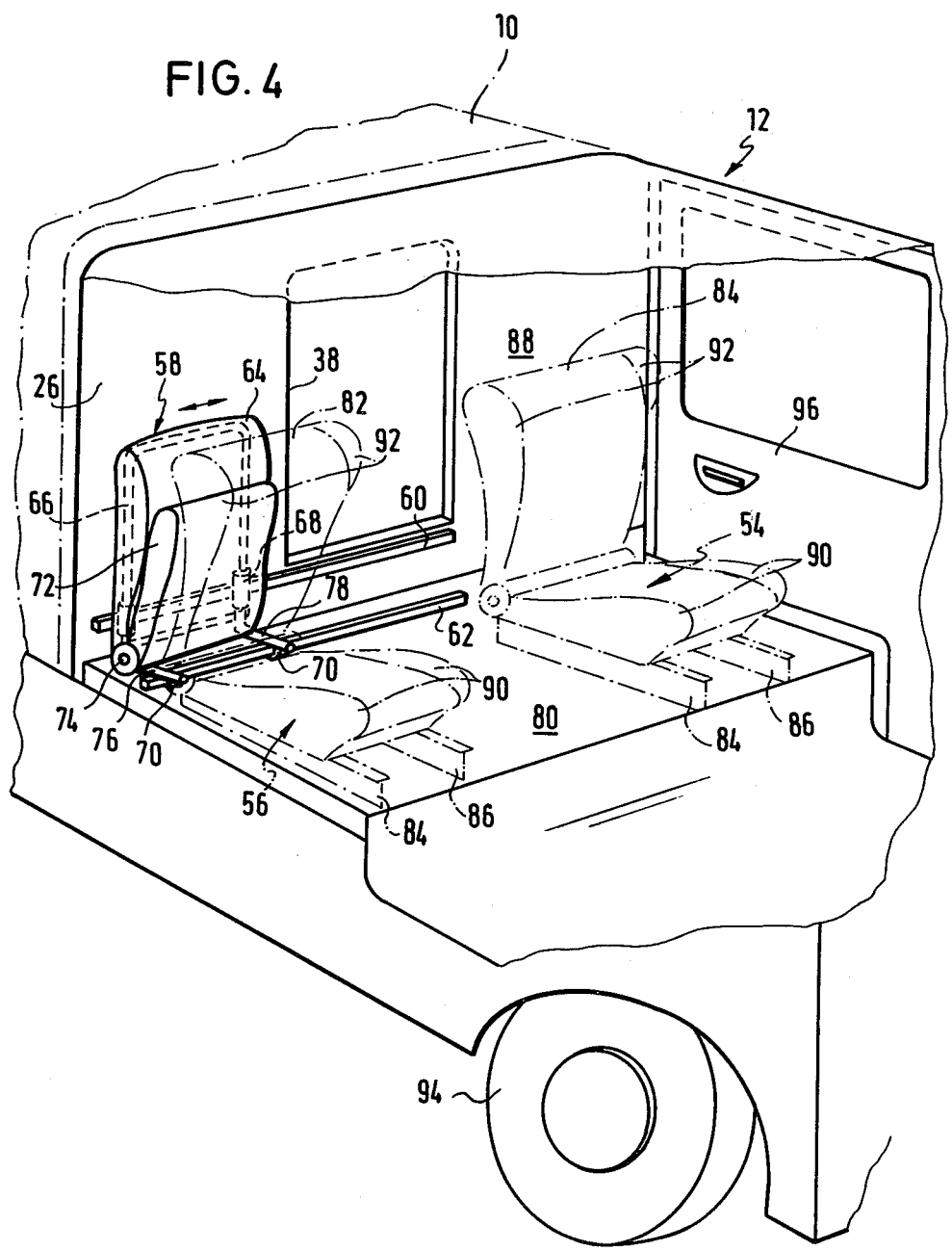

Cab 12 is schematically shown in FIG. 4, namely mostly in cut-out view so that one can see into the interior 88 of the cab. Living space 10 is indicated by dotted lines, living space 10, for example, can be a camping addition in accordance with the above description.

Passage way (opening 38) is provided in rear cab 26 which allows access to living space 10 through cab 12 and vice versa. The passage way extends almost over the entire height of the cab. On each side of the passage way is an individual seat, namely driver seat 54 and passenger seat 56. Both seats are supported on floor rails 84, 86 which run along the direction of travel of the vehicle so that the seats can be moved along these rails. Behind passenger seat 56, that is behind its back rest 82, is a third seat, namely a folding seat 58. The seat pad 72 of this third seat is folded against the back pad. This third seat can be pushed between driver and passenger seat along guide rails 60, 68 perpendicular to the direction of travel of vehicle. In this position seat pad 72 is folded downward so that in this case it is supported by frame sections 76, 78 protruding from frame 66 of seat 58 over guide track 62 of seat pad 72, in direction of travel. In the folded down position seat pad 72 assumes approx. a horizontal position. Frame 66 is equipped with guide elements 68, 70 which work together with guide rail 60, 62. The guide element 68, 70 can be in the form of slide bearings.

It is also possible to equip guide elements 68, 70 with ball bearings, so that the third seat 58 is supported on guide rail 60, 62 by means of ball bearings. This makes it considerably easier to store or retrieve third seat 58.

For retrieval or storage of the third seat 58 it is preferred that passenger seat 58 is displaced along floor rails 84, 86 somewhat to the front in the direction of vehicle travel so that the third seat 58 is not hindered by back rest 82 of passenger seat 56. In the storage position passenger seat 56 is pressed with its back rest 82 against the underside of seat pad 72, so that third seat 58 is fixed in its stored position. The width of seat pad 72 and/or back pad 64 of third seat 58 is preferably chosen in such a way that they essentially correspond to the space between passenger and driver seats. This way third seat 58 is well secured in its use position. However, additional manual means of securement such as clamps on guide rails or the like can be provided.

As FIG. 4 shows, one guide rail 62 is fastened to cab floor 80 while the other guide rail 60 is fastened to cab rear wall 26. However, it is also possible to attach guide rail 62 as well to the cab rear wall to the width spacing from guide rail 60. it is only essential that both guide rails have a certain distance from one another and that they are parallel to one another so that jamming or twisting is avoided when third seat 58 is retrieved or stored. In the case that both guide rails 60, 62 are fastened to cab rear wall 26, the seat pad is preferably supported in its unfolded position at least by one strut which upon unfolding automatically forms a support on cab floor 80. It is, of course, also possible to arrange the connection or the link 74 in such a way that it also serves as a support element. Such links are generally known.

In the example of FIG. 4, the passenger seat 56 as well as the driver seat 54, each are formed as contour seats, seat pad and back pad 90, 92. This guarantees that a third seat 58 when it is positioned between driver and passenger seat has contour type properties, although itself is not equipped with side protruding seat and back pads. In order to increase comfort of the third seat 58 at least the adjacent seat and back pads 90, 92 should be symmetric in cross section respectively, preferably of a pointed shape. The latter form not only results in more comfort for all three people seated in the cab but it also is a considerable improvement in side stability and hence reduction of injuries in the case of accidents.

It should be further explained that the back rest of driver seat 54 is identified by reference number 84 and that the right front wheel of the only partially shown vehicles is identified with reference number 94. The driver's door is identified with reference number 96.

A third seat 58 that is the center seat can be arranged that it is somewhat set back relative the two individual seats 54, 56. This may be especially true when constructed in such a way that it can be swivelled from the interior of living space 10 into the space between the individual seat 54, 56, namely around a vertical, that is upright axis.

It should be pointed out in conclusion that in the case of a vehicle with somewhat smaller load area and larger passenger space, that is larger driver cab, the camping that is the pick-up addition can preferably be extending beyond the rear end of the load platform or the rear dimension of the vehicle and can simultaneously be extended downward. This gives additional living space. Further, entrance into the living space of the camping addition from the rear is extremely facilitated.

In order to obtain equal axle loading in the latter case, the camping space is extended forward over the roof of the cab in well known fashion. In the sideview the camping addition has then an approximate U-shaped cantour with an extension of the bar forward. This extension is the part of the camping space arranged over the roof of the camp. Between the two parallel parts of the U-shape of the addition is located the rear axle and possibly the engine compartment of the vehicle (for example VW transporter with a rear engine).

I claim:

1. In combination, a motor vehicle having a cab (12) and a load platform (14), said load platform having an opening (16) adjacent the cab, a camping addition means (10) adapted to be fastened on said load platform (14) of the motor vehicle, the camping addition means having a bottom opening (18) which in the mounted condition is aligned with said opening (16) in the load platform (14) of the vehicle adjacent the cab (12), a tub-like depression means (20) located beneath said platform and aligned with said openings to form an increased height for standing in the interior of the addition means (10) to define a living space in the area of openings (16,18), said load platform having a closed load space means (22) which extends beneath the load platform (14) of the vehicle immediately behind the cab, and wherein said tub-like depression means (20) is located in said load space means and extends into said load space means (22) to define a separate closed living space.

2. The combination in accordance with claim 1 wherein said tub-like depression means (20) includes a rear wall (28) spaced from a front wall (26) of the load space (22) and two side walls (30,32) extending in the length of the motor vehicle and located to separate the interior of the living space from laterally adjacent lateral portions of the load space means (22).

3. The combination in accordance with claim 1 wherein said depression means (20) is formed as a single piece tub (34), and means connecting said tube to said addition means (10).

4. The combination in accordance with claim 3 wherein said cab includes a rear cab wall (26) having an access opening and the camping addition means includes a forward separating wall (36) abutting said rear cab wall (26) of the vehicle, said addition means (10) having an opening (38) aligned with said access opening (40) in said rear cab wall.

5. The combination in accordance with claim 1 wherein addition means (10) expands upwardly above said opening (18) and said opening (16) in said load platform (14).

6. The combination in accordance with claim 1 wherein a table support (44) for a table (46) is located within said load space means, and is spaced outwardly from said cab, said support including a pivot means for pivoting about an approximately oriented vertical axis.

7. The combination in accordance with claim 6 wherein said table (46) includes a top member adapted to cover opening (16) of load platform (14).

8. The combination in accordance with claim 5 including an air- and water-tight elastic seal means between the cab and the addition means to seal the opening (38) in the cab and the addition.

9. The combination in accordance with claim 1 including releasable connection means connected to the addition means and the load platform (14) of the motor vehicle for fastening the addition means to the vehicle.

10. The combination in accordance with claim 1 wherein the roof (52) of the addition means (10) is substantially even with the roof of cab (12).

11. The combination of claim 1 including a driver seat (54) and a passenger seat (56) within the cab, said seats being spaced sufficiently far apart to define a seating space therebetween and at least one of said seats adapted to be positioned relative to the back wall of the cab to define a spaced storage area, a third seat (58) of a folding seat construction located in said space, said third seat being collapsible and movable from said seating space to said spaced storage area.

12. The combination of claim 11 having guide rails (60, 62) extended perpendicular to the longitudinal direction of the motor vehicle and connected to support said third seat for movement to said storage area.

13. The combination of claim 12 wherein said third seat (58) has a frame (66) which carries a back pad (64) having means to mount the back pad on said guide rails (60, 62) and a seat pad attached to said frame and constructed and arranged such that said seat pad is movable to a flat position against said back pad (64).

14. The combination in accordance with claim 13 wherein said frame (14) includes frame elements (76, 78) which protrude in the direction of travel of the vehicle, and said seat pad (72) in the unfolded seating position is supported by said frame elements.

15. The combination in accordance with claim 11 wherein said third seat (58) can be secured both in the storage and in the use position.

16. The combination in accordance with claim 12 wherein said passenger seat and said driver seat are movable in the cab (88) in the direction of the travel of the vehicle for providing access to the space behind said seat.

17. The combination in accordance with claim 11 wherein said passenger seat (56) and said driver seat (54) are each shaped as contour seats with side elevated seat pads and back pads (90, 92).

18. The combination in accordance with claim 11 wherein said third seat has a pivotally mounted back pad and can be folded through said opening between said cab (88) and said camping addition (10) to define a reclining back.

19. A motor vehicle having a cab for accommodating a driver and passengers, comprising a driving seat within said cab (54), a passenger seat (56) within said cab, said seats being spaced to define a seating space therebetween, a third seat (58) of a folding seat construction located in said space, said third seat being collapsible and movable from said space to a spaced storage area, means (60, 62) extended perpendicular to the longitudinal direction of the motor vehicle and connected to support said third seat for movement behind one of said passenger or driver seats.

20. The combination of claim 19 wherein said third seat (58) has a frame (66) which carries a back pad (64) having means to mount the back pad on said guide rails (60, 62) and a seat pad attached to said frame and constructed and arranged such that said seat pad is movable to a flat position against said back pad (64).

21. The combination in accordance with claim 19 wherein said third seat (58) can be secured both in the storage and in the use position.

22. The combination in accordance with claim 19 wherein at least one of said passenger seats and driver seat is movable in the cab (88) in the direction of the travel of the vehicle for providing access to the space behind said movable seat.

23. The combination in accordance with claim 19 wherein said third seat has a back pad and can be folded through opening between cab (88) and living space (addition 10) and preferably into horizontal position so that third seat (58) can be used as a completely reclined seat to lie on.

24. A camping adapter unit adapted to be connected to a motor vehicle having a cab and load platform extending behind said cab, said load platform being adapted to have an opening (16) adjacent the cab, comprising a camping addition means (10) having fastening means adapted to be fastened on said load platform (14) of the motor vehicle, said camping addition means having a bottom wall opening (18) which in the mounted condition is aligned with opening (16) in the load platform (14), and said camping addition means having a tub-like depression means (20) secured to said platform at said bottom opening and projecting downwardly therefrom to form an increased height for standing in the interior of the addition means (10) and thereby defining a living space in the area of said bottom wall opening (18), said tub-like depression means having a lateral width less than the width of said addition means, and wherein a pivotal table support (44) for a table (46) is mounted within said tub-like depression means, said support including a pivot means for pivoting a table about an approximately oriented vertical axis.

25. The combination in accordance with claim 24 wherein said table includes a top member adapted to cover said opening.

* * * * *

UNITED STATES PATENT AND TRADEMARK OFFICE
CERTIFICATE OF CORRECTION

PATENT NO. : 4,458,939
DATED : JULY 10, 1984
INVENTOR(S) : DR. ROLAND HOHN

It is certified that error appears in the above-identified patent and that said Letters Patent is hereby corrected as shown below:

Col. 1, line 10, after "mountings" insert ---,--- (comma); col. 1 line 41, cancel "comper" and substitute therefor ---camper---; col. 1, line 41, cancel "ward" and substitute therefor ---downward---; col. 3, line 26, after "not shown" insert ---,--- (comma); col. 3, line 30, after "walls" delete ---not shown---; col. 3, line 31, after "rear walls" insert ---not shown---; col. 3, line 38, cancel "lod" and substitute therefor ---load---; col. 3, line 39, cancel "Fig. 1 and 2" and substitute therefor ---Fig. 2---; col. 3, line 46, after "opening 16" insert ---,--- (comma); col. 4, line 28, cancel "persons" and substitute therefor ---person's---

UNITED STATES PATENT AND TRADEMARK OFFICE
CERTIFICATE OF CORRECTION

PATENT NO. : 4,458,939

DATED : JULY 10, 1984

INVENTOR(S) : DR. ROLAND HOHN

It is certified that error appears in the above-identified patent and that said Letters Patent is hereby corrected as shown below:

col. 6, line 53, claim 3, cancel "tube" and substitute therefor ---tub---; col. 7, line 33, claim 13, after "(64)" insert ---and---; col. 7, line 35, claim 13, after "and" insert ---having---; col. 7, line 47, claim 16, after "driver seat" delete "are" and substitute therefor ---is---.

Signed and Sealed this

Twenty-sixth Day of February 1985

[SEAL]

Attest:

DONALD J. QUIGG

Attesting Officer

Acting Commissioner of Patents and Trademarks